(12) United States Patent
Hakkaku et al.

(10) Patent No.: US 10,926,477 B2
(45) Date of Patent: *Feb. 23, 2021

(54) BUILDING APPARATUS AND BUILDING METHOD

(71) Applicant: MIMAKI ENGINEERING CO., LTD., Nagano (JP)

(72) Inventors: Kunio Hakkaku, Nagano (JP);
Yoshihiro Tanaka, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 308 days.

This patent is subject to a terminal disclaimer.

(21) Appl. No.: 16/001,947

(22) Filed: Jun. 7, 2018

(65) Prior Publication Data

US 2018/0361673 A1    Dec. 20, 2018

(30) Foreign Application Priority Data

Jun. 15, 2017 (JP) .............................. JP2017-117904
Nov. 30, 2017 (JP) .............................. JP2017-230002

(51) Int. Cl.
*B29C 64/40* (2017.01)
*B29C 64/112* (2017.01)
(Continued)

(52) U.S. Cl.
CPC ............ *B29C 64/40* (2017.08); *B29C 64/112* (2017.08); *B29C 64/124* (2017.08); *B29C 64/209* (2017.08); *B29C 64/291* (2017.08); *B33Y 10/00* (2014.12); *B33Y 30/00* (2014.12); *B33Y 70/00* (2014.12); *B29C 64/245* (2017.08)

(58) Field of Classification Search
CPC ...... B29C 64/40; B29C 64/106; B29C 64/112; B29C 64/124; B29C 64/129; B29C 64/135
See application file for complete search history.

(56) References Cited

U.S. PATENT DOCUMENTS 5,139,711 A * 8/1992 Nakamura ............. B33Y 10/00
                                                                    264/401
5,609,814 A * 3/1997 Takano .................. B29C 64/135
                                                                    264/401
(Continued)

FOREIGN PATENT DOCUMENTS

| EP | 2572865 | 3/2013 | |
|---|---|---|---|
| JP | 01228827 A * | 9/1989 | ........... B29C 64/135 |
| JP | 2015071282 | 4/2015 | |

OTHER PUBLICATIONS

"Search Report of Europe Counterpart Application", dated Nov. 15, 2018, p. 1-p. 7.

*Primary Examiner* — Atul P. Khare
(74) *Attorney, Agent, or Firm* — JCIPRNET

(57) ABSTRACT

To build an object more appropriately. A building apparatus for building an object in three-dimensional includes: an ejection head serving as a head for an object material that eject the object material constituting the object; an ejection head serving as a head for a support material that ejects the support material; and an ejection head serving as a head for a fluid material that ejects the fluid material. In a case of forming a support layer, part of the support layer is formed with the support material, and at least the other part of the support layer is formed with the fluid material.

13 Claims, 6 Drawing Sheets

(51) Int. Cl.
*B29C 64/209* (2017.01)
*B33Y 70/00* (2020.01)
*B33Y 10/00* (2015.01)
*B33Y 30/00* (2015.01)
*B29C 64/291* (2017.01)
*B29C 64/124* (2017.01)
*B29C 64/245* (2017.01)

(56) References Cited

U.S. PATENT DOCUMENTS

| | | | | |
|---|---|---|---|---|
| 6,838,035 | B1* | 1/2005 | Ederer | B33Y 40/00 |
| | | | | 264/308 |
| 6,932,145 | B2* | 8/2005 | Frasier | B22C 9/04 |
| | | | | 164/122.2 |
| 7,114,943 | B1* | 10/2006 | Fong | B33Y 40/00 |
| | | | | 425/375 |
| 9,556,346 | B2* | 1/2017 | Suzuki | C09D 11/101 |
| 2009/0000678 | A1* | 1/2009 | Therriault | B01F 13/0059 |
| | | | | 137/833 |
| 2016/0214317 | A1* | 7/2016 | Kobayashi | B29C 64/393 |
| 2017/0120535 | A1 | 5/2017 | MacCurdy et al. | |
| 2018/0111313 | A1* | 4/2018 | Murao | B29C 64/118 |
| 2018/0222120 | A1* | 8/2018 | Hakkaku | B33Y 50/02 |
| 2018/0273756 | A1* | 9/2018 | Saito | C08L 1/08 |
| 2019/0084220 | A1* | 3/2019 | Ochi | B33Y 10/00 |

\* cited by examiner

50  OBJECT EXTERNAL APPEARANCE

CROSS SECTION

BUILDING APPARATUS AND BUILDING METHOD

CROSS REFERENCE TO RELATED APPLICATIONS

This application claims the priority benefits of Japanese Patent Application No. 2017-117904, filed on Jun. 15, 2017 and Japanese Patent Application No. 2017-230002, filed on Nov. 30, 2017. The entirety of each of the above-mentioned patent applications is hereby incorporated by reference herein and made a part of this specification.

TECHNICAL FIELD

The present disclosure relates to a building apparatus and a building method.

BACKGROUND ART

In the related art, there is known a building apparatus (3D printer) that builds an object using an ink-jet head (for example, refer to Patent Literature 1). With such a building apparatus, for example, an object is built by additive manufacturing by overlapping a plurality of layers of ink formed by the ink-jet head.

Patent Literature 1: Japanese Unexamined Patent Publication No. 2015-71282

SUMMARY

In a case of performing building with a building apparatus, cost for building may become a large problem. For example, in a case of building an object by additive manufacturing using an ink-jet head, building may be performed by using ink (for example, UV curable ink) that is the same as or similar to ink used in an ink-jet printer for printing a two-dimensional image. In this case, in view of a characteristic of a building operation of forming the object by overlapping a large number of layers, for example, a significantly larger amount of ink is consumed as compared with a case of printing a two-dimensional image with the ink-jet printer. As a result, the cost for building is largely increased. Thus, in the related art, there has been a demand for building the object using a more appropriate method. The present disclosure provides a building apparatus and a building method that can solve the above problem.

Regarding a manner of building an object, the inventors of the present disclosure have been examined a method of enabling building to be performed at lower cost. As an example of the method, they have considered that a support layer formed at a time of building the object is formed at lower cost. More specifically, in a case of building the object with the building apparatus, a support layer needs to be formed around the object being built depending on the shape of the object. In this case, the support layer is, for example, a structure that supports at least part of the object during when the object is being built. The support layer is formed as needed based on the shape of the object, for example, and removed after the building is completed.

Considering a characteristic of such a support layer, the entire support layer is not necessarily formed with an expensive material (UV curable ink and the like). Part of the support layer may be formed with a more inexpensive material, for example. Thus, the inventors of the present disclosure have considered to form part of the support layer using a fluid material such as water. With this configuration, for example, the support layer can be appropriately formed while consumption of the expensive material is suppressed. Accordingly, for example, cost for building can be appropriately reduced. The inventors of the present disclosure have confirmed that the support layer can be appropriately formed with such a configuration by actually performing an experiment and the like. Upon further investigation, the inventors found a characteristic required for obtaining such an effect, and made the present disclosure.

To solve the above problems, the present disclosure provides a building apparatus for building an object in three-dimensional, the building apparatus including: a head for an object material, configured to eject the object material as a material constituting the object; a head for a support material, configured to eject the support material as a material used for forming a support layer as a structure that supports at least part of the object during when the object is being built, the support material to be cured in accordance with a predetermined condition; and a head for a fluid material, configured to eject the fluid material as a material keeping fluidity during when the object is being built, wherein, in a case of forming the support layer, part of the support layer is formed with the support material, and at least the other part of the support layer is formed with the fluid material.

With this configuration, for example, the support layer can be appropriately formed while a use amount of the support material is suppressed. In this case, as the fluid material, an inexpensive material not including a substance for curing the material (for example, a UV curable resin) may be used. Thus, with this configuration, for example, cost for building can be reduced by forming part of the support layer with a more inexpensive material than the support material. Accordingly, for example, the object can be built more appropriately.

The support layer becomes waste (industrial waste and the like) when being removed after the building is completed. On the other hand, with this configuration, for example, the waste generated in the building can be reduced by reducing the use amount of the support material. Thus, with this configuration, also in this point of view, the object can be built more appropriately.

As the support material, for example, a material that is the same as or similar to a known support material can be preferably used. More specifically, as the support material, for example, a material that is cured by being irradiated with an ultraviolet ray (UV curable ink and the like) can be preferably used. With this configuration, among materials used for forming the support layer, the support material is present in a cured state within the support layer. The fluid material keeps fluidity within the support layer.

As the fluid material, for example, a material that is not cured under a condition for curing the support material may be used. More specifically, as the fluid material, for example, water can be preferably used. With this configuration, for example, the cost for building can be significantly and appropriately reduced. As the water, for example, tap water can be preferably used. The water used as the fluid material may be water and the like to which various additives (for example, an antiseptic, a surface-active agent, an antioxidant, or a thickener) are added in accordance with a required characteristic. As the fluid material, for example, various types of liquid containing water as a principal component may be used. In this case, "containing water as a principal component" means that, for example, the liquid contains water at a weight ratio of 50% or more.

As the fluid material, a substance other than the substance described above may be used. In this case, for example, preferably used are a substance having a specific gravity close to that of a building material and a substance having high viscosity. With this configuration, for example, the support material can be appropriately prevented from sinking into the fluid material when the support material is ejected onto the fluid material.

At the time of forming the support layer, for example, at least an outer circumference thereof may be formed with the support material, and at least part of the other region thereof may be formed with the fluid material. In this case, the outer circumference of the support layer means, for example, an outer circumference of the support layer in a plane orthogonal to a deposition direction in which an object material is deposited. The outer circumference of the support layer may be, for example, considered to be a portion of the support layer being in contact with the atmosphere. With this configuration, for example, the fluid material can be appropriately held in the support layer.

In this case, more specifically, for example, a region having a structure including a cavity inside may be formed as a support material region as a region formed with the support material in at least part of the support layer, and the fluid material may be filled in the cavity of the support material region. With this configuration, for example, the support layer can be appropriately formed by using the support material and the fluid material.

Instead of clearly forming the support material region in the support layer, the support material and the fluid material may be present therein in a mixed manner at a droplet level, for example. In this case, for example, a head for a support material and a head for a fluid material are caused to eject the support material and the fluid material so that the support material and the fluid material are present in a mixed manner in at least part of the support layer at a ratio in a range set in advance. With this configuration, for example, the support layer can be appropriately formed by using the support material and the fluid material. In this case, for example, the outer circumference of the support layer may be formed with only the support material without mixing the fluid material. With this configuration, for example, the support material and the fluid material present in a mixed manner at a droplet level can be more appropriately held in the support layer.

For example, a boundary surface of the support layer with respect to the object may be formed with the fluid material. In this case, for example, at least part of a portion of the support layer being in contact with the object may be formed with only the fluid material without using the support material. With this configuration, for example, the support material can be appropriately prevented from firmly adhering to the object. Accordingly, for example, the support layer can be removed more easily. For example, appearance of a color of the object can be prevented from being changed due to the support material remaining on a surface of the object. In this case, it is more preferable that the entire portion of the support layer being in contact with the object is formed with the fluid material.

After completely building the object, the support layer may be removed by immersing the object in the liquid together with the support layer. In this case, the support material having a property of being dissolved in a certain liquid may be used. "The support material is dissolved in a certain liquid" means, for example, that the support material in a cured state is dissolved in the certain liquid. More specifically, as the support material, for example, a water-soluble support material that is dissolved in water can be preferably used.

The support layer may be dissolved in a certain degree not only after the building is completed but also in the middle of the building. In this case, in at least part of a period during which the object is being built, the object may be built while immersing at least part of the support layer in the certain liquid. With this configuration, for example, time required for removing the support layer after the building is completed can be appropriately shortened. More specifically, in this case, after the building of the object progresses in a certain degree and a height of the object being built exceeds a predetermined height, the object may be immersed in the liquid together with the support layer. As the configuration of immersing the object in the liquid as described above, for example, the object may be built on a container in which liquid is stored, and the object is caused to gradually sink into the liquid together with the support layer in accordance with progress of the building.

As the material used for forming the support layer, the object material may be further used in addition to the support material and the fluid material. In this case, for example, part of the support layer may be formed with the object material. More specifically, for example, a structure for supporting a surrounding support material within the support layer may be formed with the object material. As the structure for supporting the surrounding support material, for example, a pillar-shaped structure or a plate-shaped structure may be formed. With this configuration, for example, even when part of the support layer is dissolved during the building, the support layer can be appropriately prevented from entirely collapsing. Accordingly, for example, a function of the support layer can be maintained more appropriately.

As a relation between the support material and the fluid material, for example, the support material in a cured state may be dissolved in the fluid material. With this configuration, the support layer can be dissolved in a certain degree during when the object is being built. Accordingly, for example, time required for removing the support layer after the building is completed can be appropriately shortened.

In a case of using the fluid material at the time of building the object, an ejection amount of the fluid material ejected from the head for a fluid material may be caused to be larger than a required amount. In this case, the fluid material may flow out onto a stage having an upper surface on which the object being built is placed. However, typically, it is not preferable that an unintended portion is caused to be in a wet state in the building apparatus. When the amount of the fluid material flowing out onto the stage increases, the fluid material may further flow out to the surroundings of the stage, and the surroundings of the building apparatus may be contaminated.

Thus, the building apparatus may further include a fluid receiving part, configured to receive the fluid material flowed out onto the stage. With this configuration, for example, the fluid material flowed out onto the stage can be appropriately managed. In this case, as the fluid receiving part, for example, a recessed part formed on a surface of the stage opposed to the head for a fluid material may be used. The recessed part formed on the stage is, for example, a groove. With this configuration, for example, the fluid material flowed out onto the stage can be appropriately received. Accordingly, for example, the fluid material can be appropriately prevented from spreading over an unintended region. In this case, the recessed part such as a groove may be formed to surround a building region of the stage. The building region of the stage means, for example, a region set in advance as a region for forming the object. As the recessed part, for example, a through hole may be formed.

As the fluid receiving part, for example, a member separated from the stage may be used. As the fluid receiving part, for example, a container (for example, a tray) that receives the fluid material flowing out from the stage may be used. In this case, the fluid receiving part is, for example, arranged on a lower side of the stage (a lower side in the gravity direction) to receive the fluid material flowing out from the stage. With this configuration, for example, the fluid material flowed out onto the stage can be appropriately received.

As a configuration of the present disclosure, a building method and the like having a characteristic similar to the characteristic described above may be used. Also in this case, for example, an effect similar to the effect described above can be obtained. The building method can be considered to be a method of manufacturing the object, for example.

According to the present disclosure, for example, the object can be built more appropriately.

BRIEF DESCRIPTION OF THE DRAWINGS

FIG. 1A illustrates an example of a configuration of a principal part of the building apparatus 10. FIG. 1B illustrates an example of a configuration of a head 12 in the building apparatus 10.

FIG. 2A illustrates an example of a configuration of the support layer 52. FIG. 2B illustrates another example of the configuration of the support layer 52. FIG. 2C illustrates yet another example of the configuration of the support layer 52.

FIG. 3A illustrates a further modification of the configuration of the support layer 52. FIGS. 3B and 3C are diagrams for explaining the modification of the configuration of the object 50.

FIG. 4A illustrates the modification of the building operation performed by the building apparatus 10. FIG. 4B illustrates the modification of the configuration of the building apparatus 10.

FIG. 5A illustrates an example of the configuration of the object 50 and the support layer 52 together with a stage 14. FIG. 5B is a diagram for explaining a characteristic of the present modification in more detail.

FIGS. 6A and 6B are perspective view and a cross-sectional view respectively illustrating a configuration of the stage 14 according to the present modification. FIGS. 6C and 6D are diagrams for explaining a further modification of the building apparatus 10.

DESCRIPTION OF EMBODIMENTS

Figure 1A:
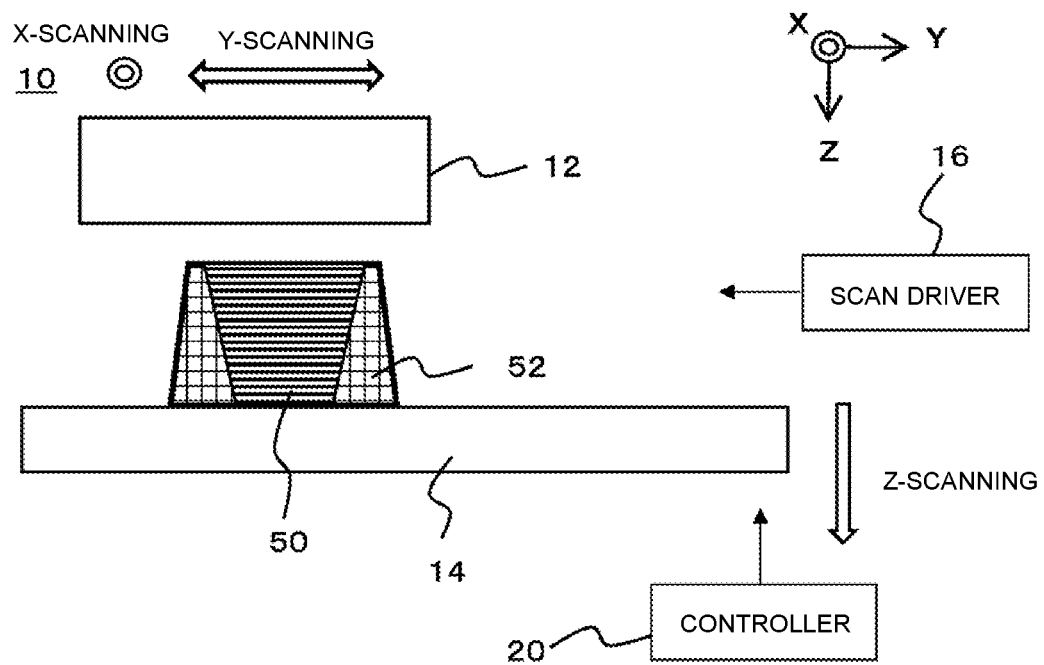
FIGS. 1A and 1B are diagrams illustrating an example of a building apparatus 10 according to an embodiment of the present disclosure.
Figure 1B:
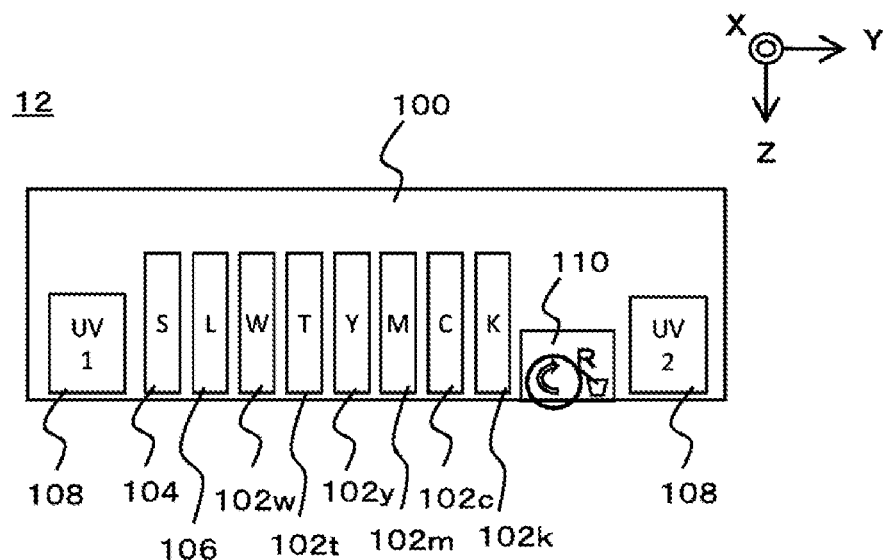

The following describes an embodiment according to the present disclosure with reference to the drawings. FIGS. 1A and 1B illustrate an example of a building apparatus 10 according to an embodiment of the present disclosure. FIG. 1A illustrates an example of a configuration of a principal part of the building apparatus 10. FIG. 1B illustrates an example of a configuration of a head 12 in the building apparatus 10.

Except the points described below, the building apparatus 10 may have a characteristic that is the same as or similar to that of a known building apparatus. More specifically, except the points described below, the building apparatus 10 may have a characteristic that is the same as or similar to that of a known building apparatus that performs building by ejecting droplets to be a material of an object 50 using an ejection head such as an ink-jet head, for example. The building apparatus 10 may further include, for example, various configurations required for building an object 50 in addition to the configuration illustrated in the drawings.

In this example, the building apparatus 10 is a building apparatus (3D printer) that builds the object 50 in three-dimensional by additive manufacturing. In this case, for example, the additive manufacturing is a method of building the object 50 by overlapping a plurality of layers. The object 50 is, for example, a three-dimensional structure.

In this example, the building apparatus 10 includes the head 12, a stage 14, a scan driver 16, and a controller 20. The head 12 is a head unit that ejects an object material and the like as a material constituting the object 50. In this example, ink is used as the object material. In this case, the ink means, for example, functional liquid. In this example, the ink can be considered to be liquid ejected from the ink-jet head. In this case, the ink-jet head means, for example, an ejection head that ejects ink droplets using an ink-jet system. More specifically, the head 12 ejects, through a plurality of ink-jet heads, ink to be cured in accordance with a predetermined condition as the object material. By curing the ink after landing, layers constituting the object 50 are overlapped to be formed. In this example, as the ink, used is UV curable ink (UV ink) that is cured by being irradiated with an ultraviolet ray.

The head 12 further ejects a material and the like of a support layer 52 in addition to the object material. Accordingly, the head 12 forms the support layer 52 around the object 50 and the like as needed. The support layer 52 means, for example, a deposition structure (support part) that surrounds an outer circumference and the like of the object 50 being built to support the object 50. The support layer 52 may also be considered to be a structure and the like that supports at least part of the object 50 during when the object 50 is being built, for example. The support layer 52 may also be considered to be a configuration and the like that supports the object 50 so that the object material does not collapse at an overhang portion, for example. The support layer 52 is formed as needed at the time of building the object 50, and removed after the building is completed. A characteristic of the support layer 52 in this example will be described later in more detail.

The stage 14 is a table-like member that supports the object 50 being built, arranged at a position opposed to the ink-jet head of the head 12, and has an upper surface on which the object 50 being built is placed. In this example, at least an upper surface of the stage 14 has a configuration that can be moved in the deposition direction (the Z-direction in the drawing), and when the stage 14 is driven by the scan driver 16, at least the upper surface is moved in accordance with progress of the building of the object 50. In this case, the deposition direction means, for example, a direction in which the object material is deposited in the additive manufacturing. More specifically, in this example, the deposition direction is a direction orthogonal to a main scanning direction (the Y-direction in the drawing) and a sub scanning direction (the X-direction in the drawing).

The scan driver 16 is a driver that causes the head 12 to perform a scanning operation of moving relatively to the object 50 being built. In this case, "moving relatively to the object 50 being built" means, for example, "moving relatively to the stage 14". "Causes the head 12 to perform a scanning operation" means, for example, to "cause the ink-jet heads and the like included in the head 12 to perform the scanning operation". In this example, the scan driver 16 causes the head 12 to perform the main scanning operation (Y-scanning), the sub scanning operation (X-scanning), and deposition direction scanning (Z-scanning).

In this case, the main scanning operation means, for example, an operation of ejecting ink while moving in the main scanning direction relatively to the object 50 being built. In this example, the scan driver 16 causes the head 12 to move while fixing the position of the stage 14 in the main scanning direction, and causes the head 12 to perform the main scanning operation. For example, the scan driver 16 may cause the object 50 to move by causing the stage 14 to move while fixing the position of the head 12 in the main scanning direction.

The sub scanning operation means, for example, an operation of moving relatively to the object 50 being built in the sub scanning direction orthogonal to the main scanning direction. More specifically, the sub scanning operation is, for example, an operation of moving relatively to the stage 14 in the sub scanning direction by a feeding amount set in advance. In this example, the scan driver 16 causes the stage 14 to move while fixing the position of the head 12 in the sub scanning direction during intervals in the main scanning operation, and causes the head 12 to perform the sub scanning operation. The scan driver 16 may cause the head 12 to move while fixing the position of the stage 14 in the sub scanning direction to cause the head 12 to perform the sub scanning operation.

The deposition direction scanning means, for example, an operation of causing the head 12 to move in the deposition direction relatively to the object 50 being built. The scan driver 16 causes the head 12 to perform the deposition direction scanning in accordance with progress of the building operation to adjust a relative position of the ink-jet head with respect to the object 50 being built in the deposition direction. More specifically, in the deposition direction scanning according to this example, the scan driver 16 causes the stage 14 to move while fixing the position of the head 12 in the deposition direction. The scan driver 16 may cause the head 12 to move while fixing the position of the stage 14 in the deposition direction.

The controller 20 is, for example, a CPU of the building apparatus 10, and controls components of the building apparatus 10 to control the building operation of the building apparatus 10. More specifically, the controller 20 controls the components of the building apparatus 10 based on shape information, and color information of the object 50 to be built, for example. According to this example, the object 50 can be appropriately built.

Subsequently, the following describes a more specific configuration of the head 12. In this example, the head 12 includes a carriage 100, a plurality of ejection heads, a plurality of UV light sources 108, and a planarizing roller 110. The carriage 100 is a holding member that holds configurations of the head 12. In this example, the head 12 includes, as a plurality of ejection heads, an ejection head 102$w$, an ejection head 102$t$, an ejection head 102$y$, an ejection head 102$m$, an ejection head 102$c$, an ejection head 102$k$, an ejection head 104, and an ejection head 106 as illustrated in FIG. 1B. The ejection heads are, for example, arranged side by side in the main scanning direction while positions thereof are aligned in the sub scanning direction.

Among these ejection heads, the ejection head 102$w$, the ejection head 102$t$, the ejection head 102$y$, the ejection head 102$m$, the ejection head 102$c$, and the ejection head 102$k$ (hereinafter referred to as the ejection heads 102$w$ to 102$k$) are ink-jet heads that eject the object material, and eject different colors of ink as the object material. More specifically, the ejection head 102$w$ ejects ink of white color (W color). The ejection head 102$t$ ejects clear ink. In this case, the clear ink means, for example, ink of clear color, that is, a colorless transparent color (T). In this example, the ejection head 102$y$, the ejection head 102$m$, the ejection head 102$c$, and the ejection head 102$k$ are ink-jet heads that eject ink for coloring the object 50. The ejection head 102$y$ ejects ink of yellow color (Y color). The ejection head 102$m$ ejects ink of magenta color (M color). The ejection head 102$c$ ejects ink of cyan color (C color). The ejection head 102$k$ ejects ink of black color (K color).

In this example, the ejection heads 102$w$ to 102$k$ are an example of heads for an object material. Each of the ejection heads 102$w$ to 102$k$ includes, for example, a nozzle array in which a plurality of nozzles are arranged in a predetermined nozzle array direction on a surface opposed to the stage 14. The nozzle array direction is a direction parallel with the sub scanning direction, for example. The ejection heads 102$w$ to 102$k$ eject ink to respective parts of the object 50 under control by the controller 20 in accordance with a structure, a color, and the like of the object 50 to be built. Due to this, the building apparatus 10 builds the object 50 the surface of which is colored, for example.

Among the ejection heads included in the head 12, the ejection head 104 is an example of the head for a support material, and ejects ink to be used as the support material. In this case, the support material means, for example, a material that is cured in accordance with a predetermined condition and used for forming the support layer 52. As the support material, for example, a known material for a support layer can be preferably used. More specifically, in this example, the UV curable ink is used also as the support material. In this case, preferably used is UV curable ink to be cured weakly as compared with the UV curable ink used as the object material, for example. With this configuration, for example, the support layer 52 can be removed more easily and appropriately.

As the support material, for example, preferably used is a material having a property of being dissolved in certain liquid. In this case, "the support material is dissolved in certain liquid" means, for example, that the support material in a cured state is dissolved in the certain liquid. More specifically, in this example, as the support material, used is a water-soluble support material that is dissolved in water. As the support material, for example, a known water-soluble support material can be preferably used. As the ejection head 104, for example, an ink-jet head that is the same as or similar to the ejection heads 102$w$ to 102$k$ can be preferably used.

In this example, the support layer 52 is formed not only by using the support material ejected from the ejection head 104, but also by using a fluid material ejected from the ejection head 106. The ejection head 106 is an example of the head for a fluid material, and ejects the fluid material as a material keeping fluidity during when the object 50 is being built. In this case, "keeping fluidity during when the object 50 is being built" means that, for example, the fluid material is not cured under a condition for curing the support material. More specifically, in this example, the fluid material is liquid. The ejection head 106 ejects water as an example of the fluid material. In this case, as the ejection head 106, for example, an ink-jet head that is the same as or similar to the ejection heads 102w to 102k can be preferably used.

In this case, "the support layer 52 is formed also by using a fluid material" means that, for example, in a case of forming the support layer 52 at the time of building the object 50, part of the support layer 52 is formed with the support material, and at least the other part of the support layer 52 is formed with the fluid material. In this case, the support material is present in the support layer 52 in a cured state. The fluid material keeps fluidity in the support layer 52. A specific configuration of the support layer 52 formed by using the support material and the fluid material will be described later in more detail.

A plurality of UV light sources 108 are light sources (UV light sources) for curing the ink, and generate an ultraviolet ray for curing UV curable ink. In this example, the respective UV light sources 108 are arranged at one end side and the other end side in the main scanning direction of the head 12 across a row of ejection heads. As the UV light source 108, for example, an ultraviolet LED (UV LED) can be preferably used. As the UV light source 108, a metal halide lamp, a mercury lamp, and the like may be used. The planarizing roller 110 is a planarizing module for planarizing a layer of the ink that is formed during when the object 50 is being built. The planarizing roller 110 planarizes the layer of the ink by being brought into contact with a surface of the layer of the ink and removing part of the ink before curing at the time of main scanning operation, for example.

By using the head 12 configured as described above, the layer of the ink constituting the object 50 can be appropriately formed. By overlapping a plurality of layers of the ink to be formed, the object 50 can be appropriately built. The support layer 52 can be appropriately formed around the object 50 and the like as needed.

The specific configuration of the head 12 is not limited to the configuration described above, and can be variously modified. For example, the head 12 may further include, as the head for an object material, an ink-jet head that ejects ink of a color other than the above colors. In this case, for example, an ink-jet head that ejects ink dedicated for building may be used, the ink dedicated for building to be used for building the inside (inside region) of the object 50. Arrangement of a plurality of ink-jet heads in the head 12 can be variously changed. For example, positions of some of the ink-jet heads may be shifted from the positions of the other ink-jet heads in the sub scanning direction.

The ejection heads in the head 12 are not necessarily held by one carriage 100, and may be separately held by a plurality of carriages 100. In this case, a plurality of carriages 100 may be independently movable. For example, as described later in more detail, at the time of forming the support layer 52, the cavity in the region formed with the support material may be filled with the fluid material by the ejection head 106. In this case, it is preferable that a timing of ejecting the fluid material is set independently of a timing of ejecting the support material in some cases. Thus, in such a case, for example, the ejection head 106 that ejects the fluid material may be held by a carriage 100 different from the carriage 100 holding the other ink-jet heads. With this configuration, the timing of ejecting the fluid material from the ejection head 106 can be set more flexibly.

In place of at least some of the ink-jet heads included in the head 12, for example, an ejection head that ejects droplets using a system other than the ink-jet system may be used. For example, as the ejection head 106 that ejects the fluid material, an ejection head that ejects the fluid material using a system other than the ink-jet system may be used. In this case, as the ejection head 106, for example, it is preferable to use an ejection head that can eject a larger amount of liquid per unit time (has a higher ejection capacity) than that of the ejection heads 102w to 102k and the ejection head 104. More specifically, as the ejection head 106, for example, a known dispenser can be preferably used. With this configuration, for example, the fluid material can be ejected from the ejection head 106 more efficiently. In a case of using the ejection head 106 having a high ejection capacity, it is especially preferable that the ejection head 106 is held by the carriage 100 different from the carriage holding the other ejection heads (the ejection heads 102w to 102k, and the ejection head 104).

Figure 2A:
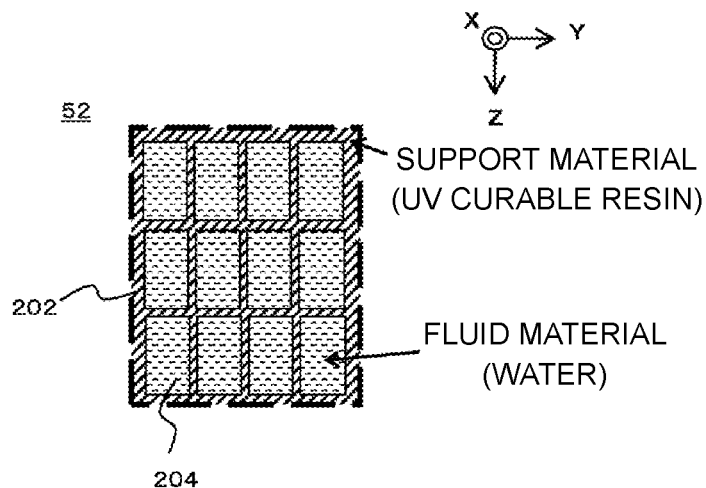
FIGS. 2A to 2C are diagrams for explaining a characteristic of a support layer 52 in more detail.
Figure 2B:
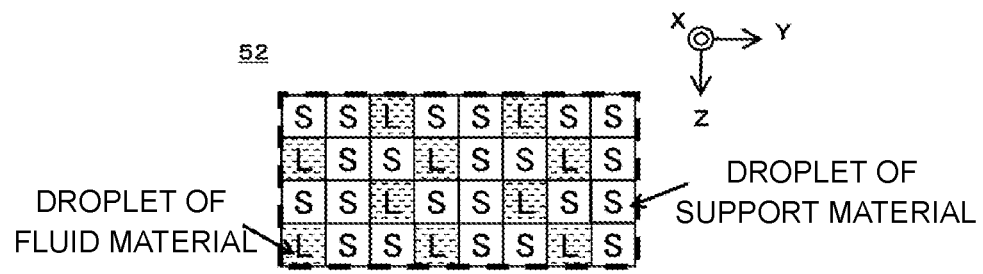
Figure 2C:
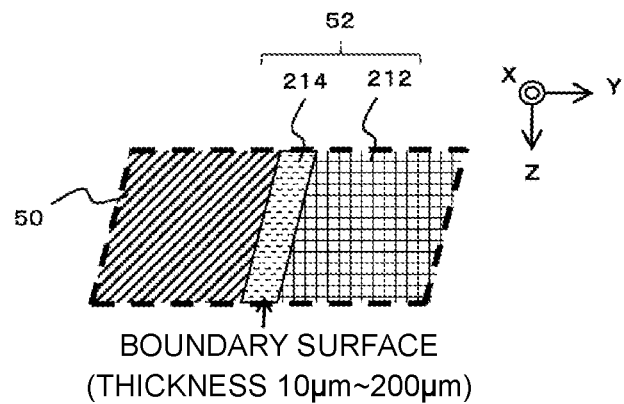

Subsequently, the following describes a characteristic of the support layer 52 formed in this example in more detail. FIGS. 2A to 2C are diagrams for explaining the characteristic of the support layer 52 in more detail, and illustrates various examples of the configuration of the support layer 52 that is formed by using the support material and the fluid material.

FIG. 2A is a diagram illustrating an example of the configuration of the support layer 52, and illustrates a configuration example of a cross section of part of the support layer 52 along a surface orthogonal to the sub scanning direction. In this example, the building apparatus 10 (refer to FIGS. 1A and 1B) forms a support material region 202 having a structure including a cavity 204 inside as part of the support layer 52. In this case, the support material region 202 means a region formed with the support material ejected from the ejection head 104 (refer to FIGS. 1A and 1B). The cavity 204 of the support material region 202 means, for example, a region in which the support material is not filled within the support layer 52. In this example, the cavity 204 of the support material region 202 is filled with water as the fluid material ejected from the ejection head 106 (refer to FIGS. 1A and 1B). Accordingly, the support layer 52 is formed by using the support material and the fluid material. With this configuration, for example, the support layer 52 can be appropriately formed while a use amount of the support material is suppressed. In this case, by forming part of the support layer 52 using water as a much inexpensive material as compared with the support material, the cost for building can be significantly reduced.

As described above, the support layer 52 is removed after the object is completely built. In this case, the support material constituting the support layer 52 needs to be processed as waste (industrial waste and the like), for example. Thus, in a case in which the use amount of the support material is large in the support layer 52, effort and cost for processing the waste are largely required. On the other hand, in this example, the waste generated through the building can be reduced, for example, by reducing the use amount of the support material. Thus, according to this example, various problems caused in a case of forming the support layer 52 can be suppressed more appropriately. Accordingly, for example, the support layer 52 can be formed more appropriately.

As described above, in this example, a water-soluble material is used as the support material. In this case, when water is used as the fluid material constituting part of the support layer 52, the support material in a cured state is assumed to be dissolved in the fluid material, so that the support material is gradually dissolved from the inside of the support layer 52 during when the object is being built. Thus, according to this example, the support layer 52 can be dissolved in a certain degree during when the object is being built, for example. Accordingly, for example, work of removing the support layer 52 performed in postprocessing after the building is further facilitated, and time required for removing the support layer 52 can be appropriately shortened.

In this case, for example, the support material can be removed more securely, so that the support material can be appropriately prevented from remaining on a surface of the object 50 after the building is completed, for example. Accordingly, appearance of a color of the object can be appropriately prevented from being changed (for example, whitened) due to the support material remaining on the surface of the object.

In this case, dissolution of the support material successively progresses from a lower side in the deposition direction, which is a portion formed earlier in the building operation. In this case, a periphery of a region in which a new layer of ink is formed with the object material is supported by the support layer 52 in a state in which dissolution of the support material does not progress. Thus, with this configuration, the object being built can be appropriately supported by the support layer 52.

Regarding the structure of the support layer 52 according to this example, as can be seen from the configuration illustrated in the drawing, for example, a region of the support material (ink) and a region of the fluid material (water) may be divided into sections, and considered as divided configurations and the like. In this case, a shape and dimensions of the section of the fluid material are not limited to the configuration illustrated in the drawing, and can be variously changed. In this case, it is preferable to increase a capacity ratio of the region in which the fluid material is filled in a range in which a supporting function of the support layer 52 can be maintained. With this configuration, for example, the cost for building can be reduced more appropriately. In this configuration, individual sections in which the fluid material is filled (cavities 204 of the support material region 202) may communicate with each other. In this case, "sections communicate with each other" means that, for example, the fluid material can move among a plurality of sections. With this configuration, the fluid material can be filled in a plurality of sections more easily and appropriately. In this case, it is desirable to form the support material region 202 so that the fluid material does not flow out to the outside of the support layer 52.

In a case of forming the support layer 52 having the configuration according to this example, the support material region 202 including the cavity 204 is formed with the support material ejected from the ejection head 104 in an operation of forming the layers of the ink to be deposited, for example, at the time of building the object. At any timing before an upper surface of the cavity 204 is blocked with the support material, the fluid material is filled in the cavity 204 through the ejection head 106. In this case, by further ejecting droplets of the support material from the ejection head 104 onto the fluid material filled in the cavity 204, a portion for blocking the upper surface of the cavity 204 is formed in the support material region 202. With this configuration, the support material region 202 including the cavity 204 can be appropriately formed.

As described above, in this example, water is used as the fluid material. With this configuration, for example, in a case of ejecting the droplets of the support material onto the fluid material, the support material can be appropriately cured before the support material sinks into the fluid material. Accordingly, through the operation as described above, the portion for blocking the upper surface of the cavity 204 can be appropriately formed in the support material region 202.

As the water for a fluid material, for example, tap water can be preferably used. The water for a fluid material may be water and the like to which various additives (for example, an antiseptic, a surface-active agent, an antioxidant, or a thickener) are added in accordance with a required characteristic. In this case, due to addition of the additive, for example, the water may be made weakly alkaline. In this case, "weakly alkaline" means, for example, a state in which pH is equal to or larger than 8 and equal to or smaller than about 10 (preferably, equal to or smaller than about 9). With this configuration, for example, in a case of dissolving the support material in the fluid material, solubility can be improved more appropriately. As the fluid material, liquid other than water may be used. In this case, for example, various types of liquid containing water as a principal component may be used. In this case, "containing water as a principal component" means that, for example, the liquid contains water at a weight ratio of 50% or more. With this configuration, an effect that is the same as or similar to the effect in a case of using water can be appropriately obtained.

As the fluid material, various types of liquid other than water may be used. In this case, for example, liquid having a property of not dissolving the support material may be used. Also in this case, the cost for building can be appropriately reduced by reducing the use amount of the support material.

In a case of using the fluid material other than water, for example, a material that is not cured under a condition for curing the support material may be used as the fluid material. As the fluid material, it is preferable to use a more inexpensive material than the support material. In this case, for example, a material not including a substance for curing a material (for example, a UV curable resin) may be used.

It is desirable that a relation between the fluid material and the support material may be such that the support material ejected onto the fluid material can be appropriately cured. To achieve this relation, for example, when the droplets of the support material are ejected onto the fluid material, it is necessary that the support material does not sink into the fluid material or is not deteriorated within time required for curing the support material. More specifically, as the fluid material, for example, (a) a substance having a specific gravity close to that of the support material or having a large specific gravity, or (b) a substance having high viscosity into which the support material sinks while taking much time, may be used. As a material corresponding to (a), for example, a paraffin-based solvent may be used. Additionally, fluorine-based inert liquid, for example, hydrofluoroether and fluorocarbon may be used. As a material corresponding to (b), for example, glycerol, and mixed liquid of glycerol and water may be used.

In view of balance with respect to sinking speed of the support material, the specific gravity of the ink (ink droplet) may be larger than that of water. In accordance with a physical property of the ink used as the support material, for example, liquid such as saturated hydrocarbon (paraffin-based, naphthenic-based, and the like), mineral oil, or silicone oil may be used. As the fluid material, it is preferable to use a material that does not chemically attack (react to)

the support material and the object material. An antiseptic, a surface-active agent, an antioxidant, a thickener, or the like may be added to the fluid material as needed. Even in a case of using various fluid materials as described above, the support layer 52 can be appropriately formed while the cost for building is suppressed.

The configuration of the support layer 52 is not limited to the configuration illustrated in FIG. 2A, and may be variously modified. For example, regarding the support layer 52, the support material region 202 is not necessarily clearly formed, and the support material and the fluid material may be present in a mixed manner at a droplet level.

FIG. 2B is a diagram illustrating another example of the configuration of the support layer 52, and illustrates a configuration example of a cross section of part of the support layer 52 orthogonal to the sub scanning direction. In this case, the ejection head 104 and the ejection head 106 are caused to eject the support material and the fluid material so that the support material and the fluid material are present in a mixed manner in at least part of the support layer 52 at a ratio in a range set in advance. Due to this, as illustrated in the drawing for example, the support layer 52 is formed so that the support material and the fluid material are present in a mixed manner in units of droplet (drop). With this configuration, for example, the support layer 52 can be appropriately formed by using the support material and the fluid material.

In this case, a ratio of the support material to the fluid material constituting the support layer 52 is set in a range in which a supporting function of the support layer 52 can be appropriately maintained. More specifically, in this case, a capacity ratio of the support material is set to be a value equal to or larger than a lower limit value for maintaining the supporting function of the support layer 52. FIG. 2B schematically illustrates an example of the configuration of the support layer 52 (configuration of Voxel) in a case in which the capacity ratio of the support material to the fluid material is about 2:1.

In a case in which the support material and the fluid material are present in a mixed manner as described above, the shape of the support layer 52 may be hardly kept appropriately if the fluid material within the support layer 52 flows out. Thus, in this case, it is especially preferable that the support layer 52 is formed so that the fluid material does not flow out to the outside of the support layer 52. More specifically, in this case, the outer circumference of the support layer 52 may be formed only with the support material without mixing the fluid material. In this case, the outer circumference of the support layer 52 means an outer circumference of the support layer in a plane orthogonal to the deposition direction in which the object material is deposited, for example. The outer circumference of the support layer 52 can be considered, for example, to be a portion of the support layer 52 to be in contact with the atmosphere. With this configuration, for example, even when the support material and the fluid material are present in a mixed manner in the support layer 52 at a droplet level, the fluid material can be appropriately held within the support layer 52.

Even in a case of such a configuration, the cost for building can be appropriately reduced by reducing the use amount of the support material. As compared with a case of forming the support layer 52 only with the support material, the support layer 52 can be removed more easily. Also in this case, by using a combination having a relation such that the support material is dissolved in the fluid material like a case of using water as the fluid material and using a water-soluble support material, for example, the support layer can be successively dissolved in a certain degree from a lower side in the deposition direction during the building. Thus, also in a case of such a configuration, work of removing the support layer 52 performed in postprocessing after the building can be further facilitated, and time required for removing the support layer 52 can be appropriately shortened.

In a further modification of the configuration of the support layer 52, for example, the support layer 52 may be removed more easily by forming part of the support layer 52 only with the fluid material. FIG. 2C is a diagram illustrating another example of the configuration of the support layer 52, and illustrates a configuration example of the vicinity of a portion of the support layer 52 being in contact with the object 50.

In this case, as illustrated in the drawing, the building apparatus 10 forms the support layer 52 including a main support part 212 and a boundary part 214. In this case, the main support part 212 is a portion other than the boundary part 214 as a portion being in contact with the object 50 in the support layer 52. In the present modification, the main support part 212 is formed, for example, by using the support material and the fluid material in the same manner as or similarly to the case illustrated in FIG. 2A or FIG. 2B. According to a further modification of the configuration of the support layer 52, the main support part 212 may be formed only with the support material without using the fluid material, for example.

The boundary part 214 is a region of a boundary portion being in contact with the object 50 in the support layer 52. The boundary part 214 may be, for example, a region having a thickness in a certain range (for example, about 10 to 200 μm) along the surface of the object 50. In the present modification, the boundary part 214 is formed only with the fluid material without using the support material. With this configuration, for example, the support material in the support layer 52 can be appropriately prevented from firmly adhering to the object 50. Due to this, for example, the support layer 52 can be removed more easily. In this case, the support material can be more appropriately prevented from adhering to and remaining on the object 50, so that, for example, appearance of a color of the object 50 can be more securely prevented from being changed due to the support material remaining on the surface of the object 50.

In a case of forming the boundary part 214 according to the present modification, for example, it is more preferable that the entire portion of the support layer 52 being in contact with the object 50 is formed only with the fluid material. With this configuration, for example, the support layer 52 can be removed more easily. Depending on the shape and the like of the object 50, only part of the portion being in contact with the object 50 may be formed only with the fluid material.

Figure 3A:
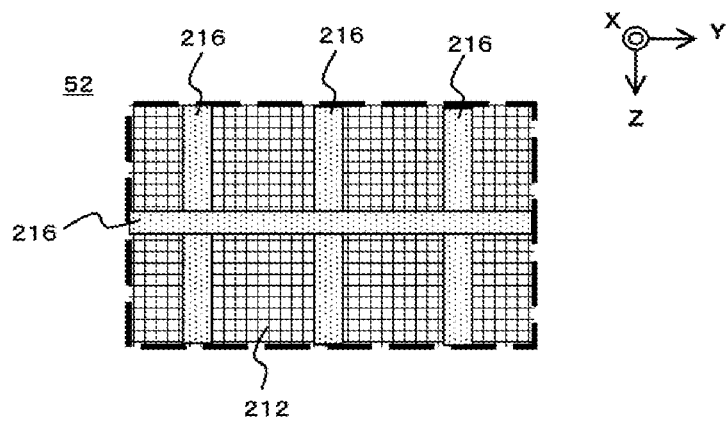
FIGS. 3A to 3C are diagrams for explaining a further modification of the configuration of the support layer 52 and a modification of a configuration of an object 50.
Figure 3B:
Figure 3C:
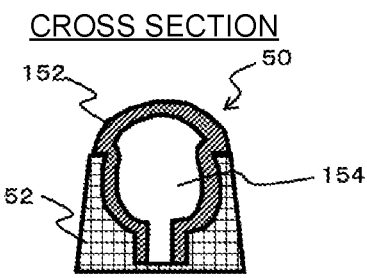

Subsequently, the following describes a further modification of the configuration of the support layer 52 formed by using the building apparatus 10 according to this example, and a modification of the configuration of the object 50. FIGS. 3A to 3C are diagrams for explaining a further modification of the configuration of the support layer 52 and a modification of the configuration of the object 50. FIG. 3A is a diagram illustrating a further modification of the configuration of the support layer 52, and illustrates a configuration example of a cross section of part of the support layer 52 orthogonal to the sub scanning direction.

As described above, in a case of forming the support layer 52 not only with the support material but also using both of the support material and the fluid material, the use amount of the support material can be reduced. However, in this case, strength of the support layer 52 may be lowered as compared with a case of forming the support layer 52 only with the support material. In a case of using a combination having a relation such that the support material is dissolved in the fluid material like a case of using water as the fluid material and using a water-soluble support material, for example, strength of a portion of the support layer 52 being dissolved may become insufficient depending on the shape and the like of the object 50 to be built.

On the other hand, in a case in which the strength of the support layer 52 needs to be enhanced, a configuration for keeping the shape of the support layer 52 may be formed within the support layer 52. As such a configuration, for example, part of the support layer 52 may be formed with the object material used for building the object 50 in place of the support material and the fluid material. More specifically, in a case of the configuration illustrated in FIG. 3A, the support layer 52 includes the main support part 212 and an undissoluble part 216. In this case, the main support part 212 is a portion other than the undissoluble part 216 in the support layer 52. The main support part 212 is formed, for example, by using the support material and the fluid material in the same manner as or similarly to the case illustrated in FIGS. 2A to 2C.

The undissoluble part 216 is a portion formed with a material that is not dissolved in the fluid material. More specifically, in the present modification, the undissoluble part 216 is formed with the object material. In this case, the object material is, for example, ink ejected from the ejection heads 102w to 102k (refer to FIGS. 1A and 1B) in the head 12. In this case, for example, the undissoluble part 216 is formed to be a pillar-shaped structure or a plate-shaped structure within the support layer 52 to function as a structure that supports a surrounding support material. With this configuration, for example, the stable support layer 52 can be formed more appropriately while the use amount of the support material is suppressed. In this case, for example, when part of the support layer 52 is dissolved during the building, the support layer 52 can be appropriately prevented from entirely collapsing. Accordingly, for example, the function of the support layer 52 can be maintained more appropriately.

In the above description, mainly described is a case of reducing the use amount of the support material to reduce the cost for building by using the support material and the fluid material. However, when the fluid material is used, the use amount of the object material used for building the object 50 can be similarly reduced.

FIGS. 3B and 3C are diagrams for explaining a modification of the configuration of the object 50. FIG. 3B illustrates an example of an external appearance (object external appearance) of the completed object 50. FIG. 3C illustrates a state of a cross section of the object 50 together with a cross section of the support layer 52. In this case, the support layer 52 is formed by using the support material and the fluid material in the same manner as or similarly to each configuration described above. Due to this, the use amount of the support material is reduced.

In the present modification, as illustrated in FIG. 3C, the object 50 is formed to be a structure including a building material region 152 and a cavity 154. In this case, the building material region 152 is a region formed with the object material, and formed in an outer circumference region of the object 50 to surround the cavity 154 inside the object 50. The cavity 154 is a region in which the object material is not filled inside the object 50. With this configuration, for example, the use amount of the object material used for building the object 50 can be appropriately reduced. Due to this, the cost for building the object 50 can be appropriately reduced.

In this case, the cavity 154 in the object 50 is, for example, formed by utilizing the fluid material ejected from the ejection head 106 in the head 12. More specifically, in this case, at the time of building the object 50, by forming the surrounding building material region 152 in a state in which the fluid material is filled in a region in which the cavity 154 should be formed, the object 50 including the building material region 152 and the cavity 154 is built. In this case, the fluid material filled in the cavity 154 may be extracted from the object 50 by the time when the building is completed. In this case, for example, a hole may be formed on part of the surface of the object 50, and the fluid material may be extracted through the hole. Depending on a use, required quality, and the like of the object 50, the building of the object 50 may be completed in a state in which the fluid material is kept being filled in the cavity 154.

Figure 4A:
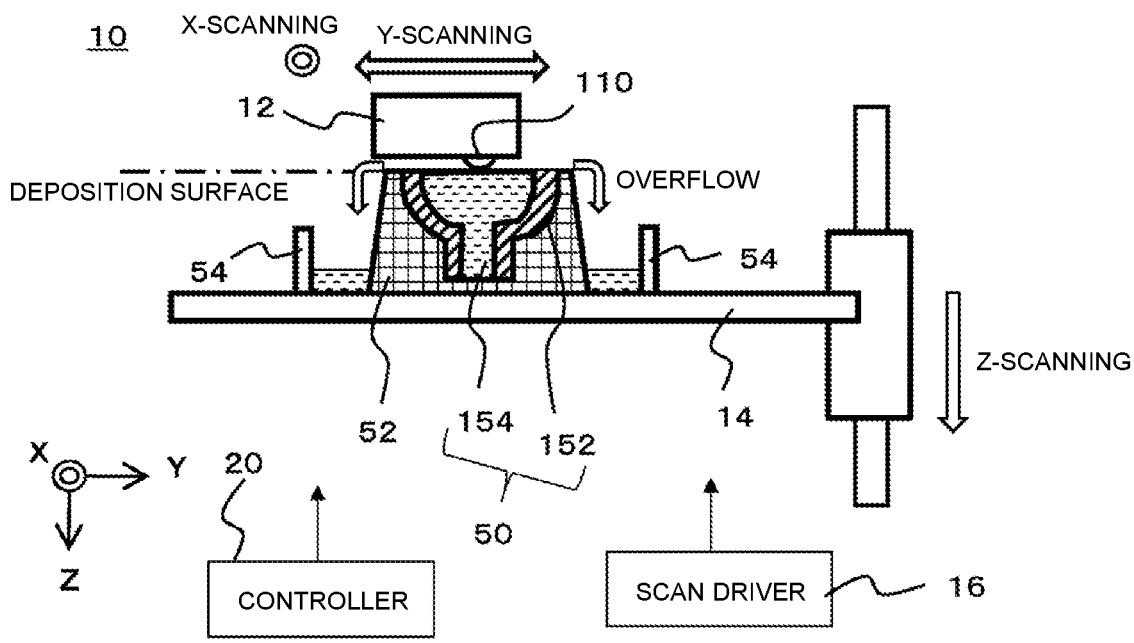
FIGS. 4A and 4B are diagrams for explaining a modification of a building operation and a configuration of the building apparatus 10.
Figure 4B:
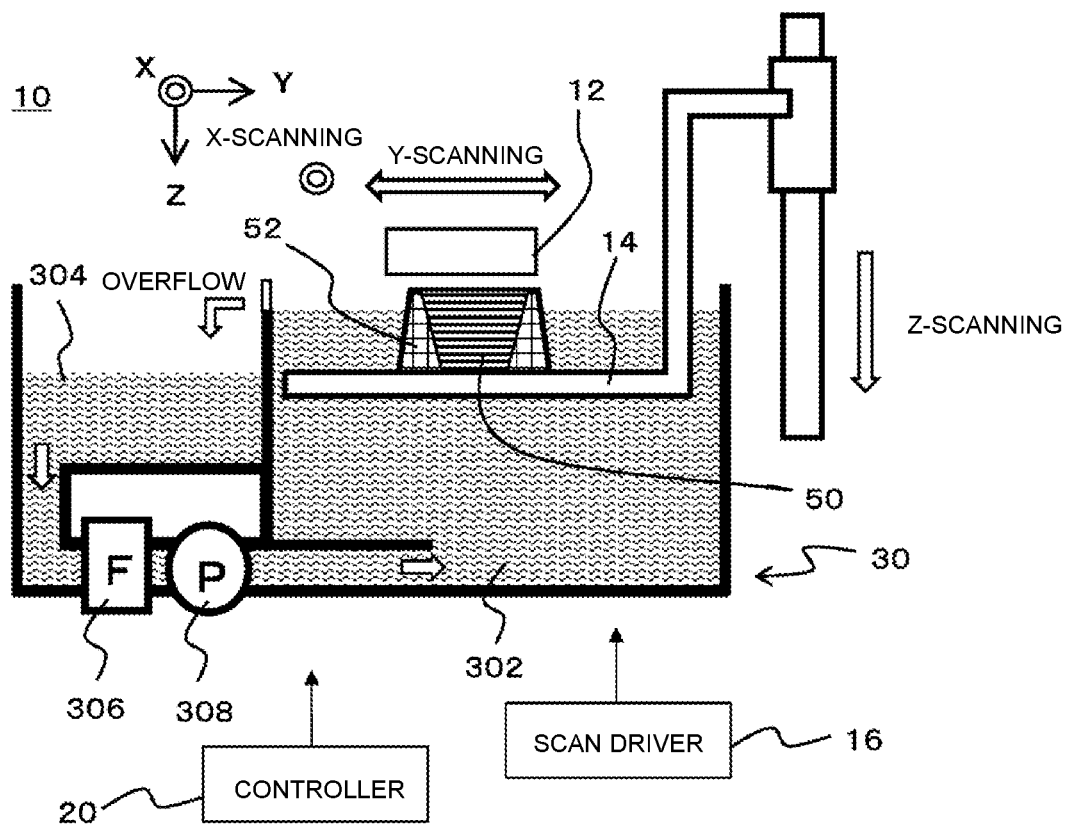

Subsequently, the following describes a modification of the building operation performed by the building apparatus 10 and a modification of the configuration of the building apparatus 10. FIGS. 4A and 4B are diagrams for explaining modifications of the building operation and the configuration of the building apparatus 10. Except the points described below, in FIGS. 4A and 4B, a configuration denoted by the same reference numeral as that in FIGS. 1A to 3C may have a characteristic that is the same as or similar to that of the configuration in FIGS. 1A to 3C.

FIG. 4A is a diagram illustrating the modification of the building operation performed by the building apparatus 10, and illustrates an example of the building operation in a case of building the object 50 having a configuration that is described with reference to FIGS. 3B and 3C. For convenience of illustration, FIG. 4A illustrates the building apparatus 10 having a configuration partially different from that in FIG. 1A. However, the building operation described below may be performed by using the building apparatus 10 illustrated in FIG. 1A, for example.

More specifically, in this building operation, as described above with reference to FIGS. 3B and 3C, the object 50 including the building material region 152 and the cavity 154 is built. During the building, as illustrated in the drawing, for example, the building material region 152 and the support layer 52 are formed in a state in which the fluid material is filled in the cavity 154.

In this case, the fluid material within the cavity 154 may also be considered as a support part inside the object 50, for example. More specifically, in this case, by ejecting ink used as the object material onto the fluid material within the cavity 154, various shapes of building material regions 152 can be formed. Due to this, for example, a portion that blocks an upper side of the cavity 154 in the building material region 152 can be appropriately formed without ejecting the support material and the like into the cavity 154. Thus, with this configuration, for example, the object 50 including the cavity 154 inside can be built more appropriately.

In this case, in parallel with the operation of depositing the layer of the ink constituting the object 50, the fluid material is ejected from the ejection head 106 into the cavity 154 while maintaining a position of a deposition surface (deposition upper surface). Due to this, the fluid material is filled in the cavity 154. In this case, the position of the deposition surface means a position (position in the deposition direction) of a layer that is being formed through a depositing operation of depositing the layer of the ink. "The fluid material is ejected while maintaining the position of the deposition surface" means that the fluid material is ejected through the operation of building the object 50 without separately performing deposition direction scanning (Z-scanning) for filling the fluid material. More specifically, in this case, the fluid material may be ejected through the main scanning operation of ejecting the object material and the support material.

In this case, a larger amount of fluid material than a minimum required amount may be ejected so that the fluid material within the cavity 154 does not run short, for example. In this case, an excessive fluid material exceeding the deposition surface in the middle of the depositing operation may overflow a layer surface, may adhere to the planarizing roller 110 through a planarizing operation by the planarizing roller 110 of the head 12 and be removed together with part of the ink before curing, or may overflow the cavity 154 by being pushed out by the planarizing roller 110 and flow out through the upper surface of the object 50 being built.

On the other hand, in the present modification, as illustrated in the drawing for example, a wall part 54 is formed for holding the overflowed fluid material on the stage 14. In this case, at an initial stage of the operation of building the object 50, for example, the wall part 54 that surrounds the object 50 is formed on the stage 14 in parallel with the building of the object 50. In this case, the wall part 54 is formed on the stage 14 to surround the object 50 and the support layer 52 with a gap between itself, and the object 50 and the support layer 52 so that the fluid material can be stored between the wall part 54, and the object 50 and the support layer 52.

With this configuration, for example, even when the fluid material overflows the cavity 154, influence on the surroundings can be appropriately suppressed. In this case, the fluid material overflowed from the cavity 154 does not widely spread over the stage 14, and is stored in a region surrounded by the wall part 54. Thus, after the building of the object 50 is completed, for example, before or after the object 50 and the support layer 52 are peeled off from the stage 14, only the fluid material within a range surrounded by the wall part 54 may be removed by, for example, being sucked by a pipette. In this case, by breaking the wall part 54, the wall part 54 can also be easily and appropriately removed from the stage 14. Thus, with this configuration, the building operation using the fluid material can be more appropriately performed.

The height (height in the deposition direction) of the wall part 54 may be a height such that the overflowed fluid material does not leak to the outside of the wall part 54. Thus, the height of the wall part 54 may be lower than that of the object 50 as illustrated in the drawing, for example. The wall part 54 may be formed by using at least one of the support material and the object material. In this case, the wall part 54 may be formed by using both of the support material and the object material. Similarly to the various configurations and the like of the support layer 52 described above, part of the wall part 54 may be formed with the fluid material, for example.

In this case, the fluid material is stored between the wall part 54 and the support layer 52, so that at least part of the support layer 52 is immersed in the fluid material on an outer face side of the support layer 52. Thus, in a case of using a combination having a relation such that the support material is dissolved in the fluid material like a case of using water as the fluid material and using a water-soluble support material, for example, an outer side of the support layer 52 is dissolved in a certain degree in the middle of the building operation. Thus, with this configuration, for example, time required for removing the support layer after the building is completed can be appropriately shortened.

Such a configuration may be considered, for example, as an operation of building the object 50 while immersing at least part of the support layer 52 in certain liquid in at least part of a period during which the object 50 is being built. From this point of view, the building apparatus 10 may be configured such that the support layer 52 may be immersed in liquid more actively.

FIG. 4B illustrates a modification of the configuration of the building apparatus 10. In the present modification, the building apparatus 10 further includes a liquid storage container 30 in addition to the configuration of the building apparatus 10 illustrated in FIG. 1A and FIG. 4A. The liquid storage container 30 is a container that stores liquid in which the support material is dissolved, and includes a first liquid chamber 302, a second liquid chamber 304, a filter 306, and a pump 308.

In this configuration, as the liquid stored in the liquid storage container 30, for example, the same liquid as the fluid material used for forming the support layer 52 may be used. More specifically, in a case of forming the support layer 52 using the water-soluble support material and water, the water may also be used as the liquid stored in the liquid storage container 30. As the liquid stored in the liquid storage container 30, a solvent and the like other than water may be used. In this case, for example, liquid different from the fluid material used for forming the support layer 52 may be used.

In this configuration, the first liquid chamber 302 is a liquid chamber for immersing the object 50 being built and the support layer 52 in the liquid. The first liquid chamber 302 is a liquid chamber having a size for housing the stage 14 therein, and a liquid surface thereof is always maintained, due to the overflow, at a position lower than a lower surface of the head 12 and lower than the deposition surface during the building. The first liquid chamber 302 houses the stage 14 having the upper surface on which the object 50 being built and the support layer 52 are placed so that the support layer 52 is immersed in the liquid within the first liquid chamber 302. Due to this, at least part of the support layer 52 is dissolved in a certain degree in the middle of the building.

In this case, the building apparatus 10 causes the position of the stage 14 in the deposition direction to be gradually changed corresponding to a deposition height in accordance with progress of the building operation, and moves the stage 14 to a deep position in the first liquid chamber 302 to immerse part of the support layer 52 in the liquid. Due to this, for example, in at least part of the period during which the object 50 is being built, the building apparatus 10 builds the object 50 while immersing at least part of the support layer 52 in the liquid within the first liquid chamber 302. With this configuration, the support layer 52 can be successively dissolved from a lower side during when the object 50 is being built. Due to this, for example, time required for removing the support layer 52 after the building is completed can be appropriately shortened. This configuration may be considered, for example, as a configuration in which the object 50 is built on the container in which the liquid is stored, and the object 50 is caused to gradually sink into the liquid together with the support layer 52 in accordance with progress of the building.

In this configuration, the second liquid chamber 304 is a liquid chamber for storing liquid overflowed from the first liquid chamber 302 due to the overflow of the first liquid chamber 302. The position of the liquid surface of the second liquid chamber 304 is preferably adjusted to be lower than the position of the liquid surface of the first liquid chamber 302 as illustrated in the drawing, for example. In the present modification, the first liquid chamber 302 is connected to the second liquid chamber 304 via the filter 306 and the pump 308. The filter 306 is a filter that filters the liquid flowing from the second liquid chamber 304 to the first liquid chamber 302. The pump 308 is a pump that causes the liquid to flow from the second liquid chamber 304 to the first liquid chamber 302, and delivers the liquid to the first liquid chamber 302 at least during the building. With this configuration, the liquid can be appropriately circulated between the first liquid chamber 302 and the second liquid chamber 304 while the liquid is filtered through the filter 306. By delivering the liquid from the second liquid chamber 304 to the first liquid chamber 302 by the pump 308, and causing the liquid overflowed from the first liquid chamber 302 to flow to the second liquid chamber 304, the position of the liquid surface of the first liquid chamber 302 can be appropriately adjusted. In this case, by circulating the liquid as described above, the liquid can be reused. In a case in which a dissolving capacity of the liquid for the support layer 52 is deteriorated due to a long use, for example, it is preferable that the liquid is discharged from a waste liquid port (not illustrated) to be replaced with new liquid.

In this case, the position of the liquid surface of the first liquid chamber 302 is related to a timing when the support layer 52 starts to immerse in the liquid. More specifically, in the present modification, the timing when the support layer 52 starts to immerse in the liquid is determined in accordance with a distance (distance in the deposition direction) between the deposition surface and the liquid surface of the first liquid chamber 302. In this case, as a difference between both positions is smaller, the support layer 52 is immersed in the liquid at an earlier timing, and the support layer 52 is dissolved more rapidly.

Thus, in this case, by adjusting a positional relation between the deposition surface and the liquid surface of the first liquid chamber 302, for example, the timing when the support layer 52 starts to immerse in the liquid can be adjusted. More specifically, in this case, after the building of the object 50 progresses in a certain degree and the height of the object 50 being built exceeds a predetermined height, adjustment may be performed so that the support layer 52 and the object 50 are immersed in the liquid. With this configuration, time for immersing the support layer 52 in the liquid can be appropriately adjusted. In this case, the position of the height of the liquid surface of the first liquid chamber 302 can be set by adjusting a height of an outlet of the overflow.

In this case, after the building is completed, for example, the stage 14 may be sufficiently lowered, and the entire object 50 and support layer 52 may be immersed in the liquid in the first liquid chamber 302 to be left as it is. With this configuration, for example, postprocessing for dissolving the support layer 52 after the building can be appropriately performed. The liquid storage container 30 may further include an ultrasonic wave generator, for example. In this case, by oscillating the liquid within the first liquid chamber 302 with ultrasonic waves, the support layer 52 can be removed more efficiently. In this case, for example, by controlling a timing for generating ultrasonic waves, efficiency of removal of the support layer 52 may be improved while influence on accuracy in the building is suppressed. More specifically, in this case, the ultrasonic wave may be generated while avoiding a timing for ejecting the ink in the main scanning operation.

In a case of performing building by using the fluid material, the components of the building apparatus 10 may be configured to be more appropriate for a case of using the fluid material. More specifically, as described above, in a case of forming the cavity in the object 50 or the support layer 52 and filling the fluid material in the cavity, a larger amount of fluid material than a required amount (minimum required amount) may be ejected so that the fluid material does not run short. In this case, the fluid material may flow out onto the stage 14. On the other hand, in such a case, as described above with reference to FIG. 4A for example, by forming the wall part on the stage 14 in parallel with the operation of the object 50, the fluid material may be stored in a certain region on the stage 14.

However, in this case, processing and the like for removing the wall part are required after the building is completed, so that effort of postprocessing after the building may be increased. The ink is consumed for forming the wall part, so that the cost for building may be increased, for example. Thus, in a case in which the fluid material may flow out onto the stage 14 with high possibility, for example, the fluid material flowed out onto the stage 14 may be collected by using the configuration of the building apparatus 10.

FIGS. 5A, 5B and 6A to 6D are diagrams for explaining a further modification of the configuration of the building apparatus 10. Except the points described below, in FIGS. 5A, 5B and 6A to 6D, a configuration denoted by the same reference numeral as that in FIGS. 1A to 4B may have a characteristic that is the same as or similar to that of the configuration in FIGS. 1A to 4B. Except the points described below, the building apparatus 10 according to the present modification may have a characteristic that is the same as or similar to that of the building apparatus 10 described above with reference to FIGS. 1A to 4B. For example, except the points described below, the building apparatus 10 may have a configuration that is the same as or similar to the configurations illustrated in FIGS. 1A and 1B, for example.

Figure 5A:
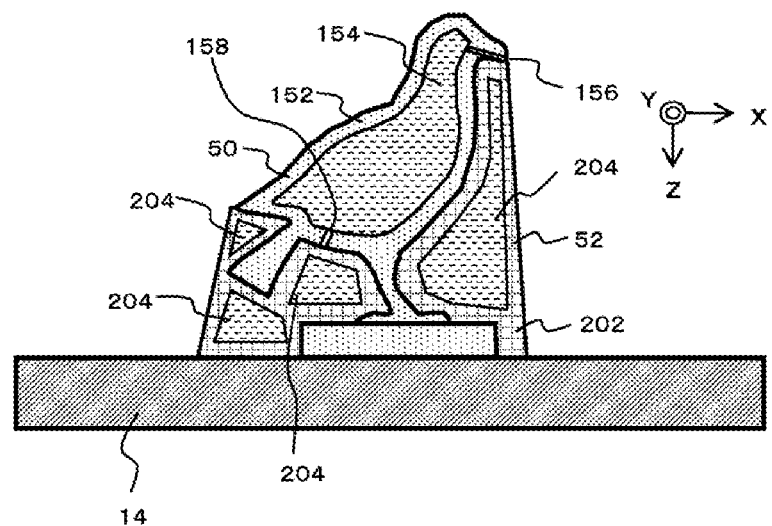
FIGS. 5A and 5B are diagrams for explaining a modification of the configuration of the building apparatus 10.
Figure 5B:
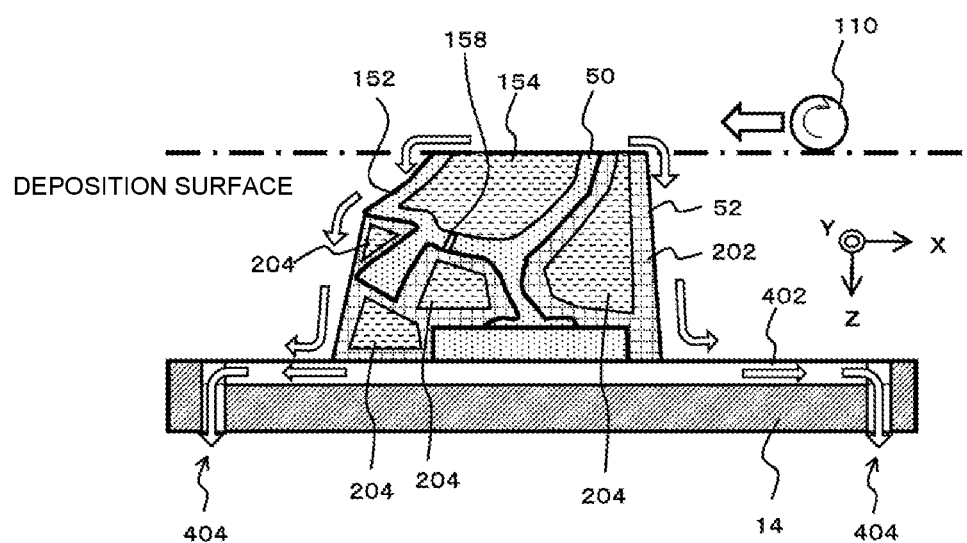

FIGS. 5A and 5B are diagrams for explaining a characteristic of the stage 14 included in the building apparatus 10 according to the present modification. FIG. 5A is a diagram illustrating an example of the configuration of the support layer 52 and the object 50 built in the present modification together with the stage 14, and illustrates an example of the configuration of the stage 14, the object 50, and the support layer 52 without illustrating a characteristic portion of the stage 14. In the present modification, the building apparatus 10 builds the object 50 on the stage 14 in the same manner as or similarly to the case described above with reference to FIGS. 1A to 4B. The support layer 52 is formed around the object 50 and the like as needed. In this case, as illustrated in the drawing, the object 50 including the building material region 152 and the cavity 154 is formed as the object 50. At the time of building, the fluid material is filled in the cavity 154 of the object 50. Also in this case, liquid that is not cured (non-curable liquid) such as water is used as the fluid material. For example, the building material region 152 is formed to have a predetermined thickness or more in a normal direction of an outer peripheral surface of the object 50, and to have the cavity 154 inside. The fluid material is ejected from the ejection head 106 (refer to FIGS. 1A and 1B) at the same time as the operation of building the object 50, and filled in the cavity 154. As the support layer 52, the support layer 52 including the support material region 202 and the cavity 204 is formed. Similarly to the above configuration, the fluid material is filled in the cavity 204 of the support layer 52 using the ejection head 106.

In this case, for example, after the building operation performed by the building apparatus 10 is completed, as illustrated in the drawing, an air injection hole 156 and a discharge hole 158 are formed in the building material region 152. The fluid material within the cavity 154 is discharged by using a syringe, for example. With this configuration, for example, the object 50 including the cavity 154 inside can be appropriately built. By building the object 50 or forming the support layer 52 using the fluid material, the use amount of the ink used as a material of the object 50 or as the support material can be appropriately reduced. In the present modification, the building apparatus 10 further has a configuration of collecting the fluid material flowed out onto the stage 14 as described below.

FIG. 5B is a diagram for explaining a characteristic of the present modification in more detail, and illustrates an example of a more specific configuration of the stage 14 together with the object 50 being built. As described above, in a case of building the object 50 or forming the support layer 52 by using the fluid material, the fluid material is filled in the cavity 154 or the cavity 204 in parallel with the operation of depositing the layer of the ink constituting the building material region 152 and the support material region 202. In this case, as illustrated in the drawing for example, planarization is performed by the planarizing roller 110 to always align the upper surface of deposition and the upper surface of the fluid material. In this case, through the planarizing operation, excessive fluid material overflows the deposition upper surface to flow out onto the stage 14, and becomes waste liquid.

On the other hand, in the present modification, the stage 14 includes a waste liquid groove 402 and a drain 404. The waste liquid groove 402 is, for example, a groove formed on a surface of the stage 14 opposed to the ejection head 106 and the like, and formed around a region (building region) in which the object 50 is built on the stage 14 to receive the fluid material flowed out onto the stage 14 at the time of building. In this case, the building region is, for example, a region set in advance as a region for forming the object 50. The waste liquid groove 402 is an example of a recessed part and a fluid receiving part formed on the stage 14. With this configuration, for example, the fluid material can be appropriately prevented from spreading over an unintended range on the stage 14. Accordingly, for example, in a case in which the amount of the fluid material flowing out onto the stage 14 is increased, the fluid material can be appropriately prevented from further flowing out around the stage 14 or contaminating the surroundings of the building apparatus 10.

In the present modification, the waste liquid groove 402 is connected to a plurality of drains 404, and discharges the fluid material via the drains 404. The drains 404 are discharge ports for the fluid material, and discharge the fluid material flowed into the waste liquid groove 402 to the outside of the stage 14. In the present modification, the drains 404 are connected to a pump (not illustrated), and discharge the fluid material in accordance with suction force of the pump. According to the present modification, even in a case in which the fluid material flows out onto the stage 14, the fluid material can be appropriately managed to be discharged to the outside of the stage 14. In this case, unlike the case in which the wall part is formed on the stage 14 to store the fluid material, for example, processing and the like for removing the wall part after the building is completed are not required. As a result of discharging the fluid material via the drain 404, the building apparatus 10 itself has a function of discharging the fluid material (drainage function), and processing and the like for collecting accumulated fluid material are not required to be separately performed. Thus, according to the present modification, for example, the fluid material flowed out onto the stage 14 can be collected more easily.

Figure 6A:
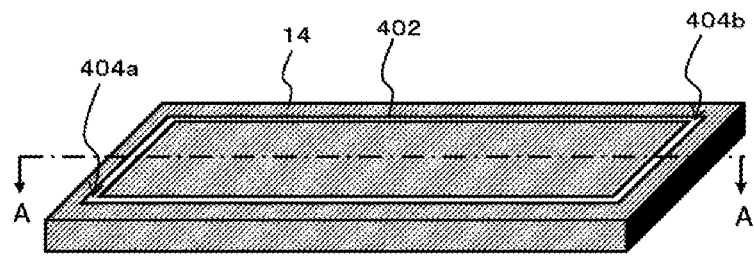
FIGS. 6A to 6D are diagrams for explaining a modification of the configuration of the building apparatus 10.
Figure 6B:
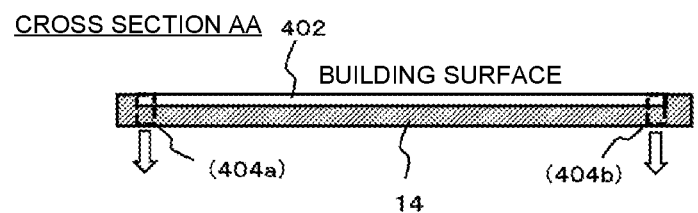

As described above, in this example, the waste liquid groove 402 is formed around the building region. More specifically, in this case, as illustrated in FIGS. 6A and 6B, the waste liquid groove 402 and the drains 404 may be formed. FIGS. 6A and 6B are a perspective view and a cross-sectional view illustrating the configuration of the stage 14 according to the present modification. In the present modification, the building region may be set, for example, to include a center part of a building surface of the stage 14. In this case, the building surface of the stage 14 is a surface of the stage 14 opposed to the head 12 (refer to FIGS. 1A and 1B). In this case, as illustrated in the drawing for example, the waste liquid groove 402 may be formed along the outer circumference of the stage 14 in the vicinity of an edge of the stage 14. With this configuration, for example, the building region can be appropriately surrounded by the waste liquid groove 402. Due to this, for example, the fluid material flowed out onto the stage 14 can be appropriately received.

In this case, as illustrated in the drawing as drains 404a and 404b, for example, the drains 404 are preferably formed at different positions in the waste liquid groove 402. More specifically, in FIGS. 6A and 6B, the drains 404a and 404b are formed at one end side and the other end side of a diagonal line on the stage 14. In this case, the drain 404a is a drain on the near side in the drawing. The drain 404b is a drain on the far side in the drawing. With this configuration, for example, the fluid material in the waste liquid groove 402 can be efficiently and appropriately discharged.

In a case in which the fluid material flowed out onto the stage 14 can be appropriately collected like the present modification, the fluid material may be utilized more actively for various purposes. More specifically, for example, in a case of using the water-soluble support material and using water as the fluid material, the fluid material may be intentionally ejected to the periphery (outside) of the support layer 52 so that the fluid material is splashed on the support layer 52. With this configuration, for example, the support layer 52 can be dissolved in a certain degree in the middle of the building. Due to this, for example, the support layer 52 can be removed more easily after the building is completed. Additionally, for example, by ejecting the fluid material from the ejection head 106 onto the stage 14, the stage 14 may be cleaned during the building. With this configuration, for example, the ink dropped on the stage 14 can be appropriately prevented from firmly adhering to the stage 14 to be hardly removed.

In a case of ejecting the fluid material for such various purposes, the fluid material may be ejected by using the ejection head 106 in the head 12. With this configuration, for example, the fluid material can be utilized for various uses without adding a new configuration. In a modification of the configuration of the building apparatus 10, the liquid may be ejected by using a configuration different from that of the ejection head 106. In this case, as the liquid, the same liquid as the fluid material ejected from the ejection head 106 may be used. Depending on a use of the liquid, liquid different from the fluid material may be used. For example, in a case of cleaning the stage 14 with liquid, cleaning liquid and the like may be used. In a case of ejecting the liquid using a dedicated configuration, for example, the liquid can be ejected using a method more appropriate for a use of the liquid. More specifically, as such a dedicated configuration, a configuration in which an ejection amount per unit time is larger than that of the ejection head 106 may be used, for example. For example, in a case of cleaning the stage 14 with liquid, a configuration of ejecting liquid that is flowing more strongly (for example, a strong stream of water) than that of the ejection head 106 may be used.

The configuration of collecting the fluid material flowed out onto the stage 14 is not limited to the configuration described above, and may be further modified, for example. For example, as the recessed part formed on the stage 14, a through hole may be formed in place of the waste liquid groove 402. In this case, for example, the through hole is a recessed part at least part of which passes through the stage 14. Alternatively, a through hole may be further formed in addition to the waste liquid groove 402. As the fluid receiving part for collecting the fluid material, for example, a member separated from the stage 14 may be used. More specifically, in this case, as illustrated in FIGS. 6C and 6D for example, a waste liquid tray 406 may be used.

Figure 6C:
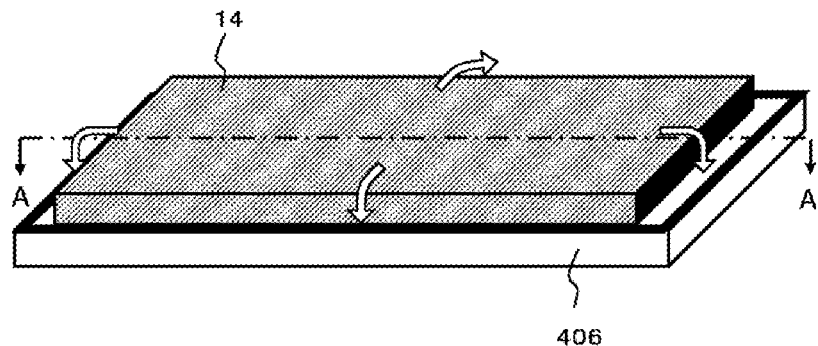
Figure 6D:
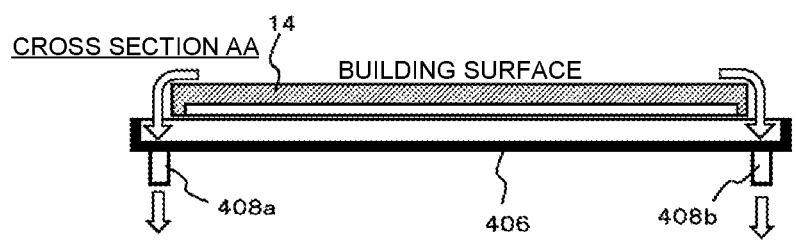

FIGS. 6C and 6D are diagrams for explaining a further modification of the building apparatus 10, and are a perspective view and a cross-sectional view illustrating an example of the stage 14 and the waste liquid tray 406 used in the present modification. In the present modification, as the stage 14, for example, used is the stage 14 having a characteristic that is the same as or similar to that in the case described above with reference to FIGS. 1A to 4B. By using the waste liquid tray 406 separated from the stage 14, the fluid material flowed out onto the stage 14 is collected.

In this case, the waste liquid tray 406 is an example of the fluid receiving part, and receives the fluid material flowed out from the stage 14 to collect the fluid material at the outside of the stage 14. More specifically, in the present modification, the waste liquid tray 406 is a container having a tray shape (waste liquid tray) as illustrated in the drawing, for example, and is arranged on a lower side (lower side in the gravity direction) of the stage 14 to cover a lower side of the stage 14 to receive and collect the fluid material flowed out from the stage 14 to the outside of the stage 14. In the present modification, the waste liquid tray 406 includes a plurality of drains 408a and 408b. The drains 408a and 408b are discharge ports for discharging the fluid material from the waste liquid tray 406. In the illustrated configuration, the drain 408a is a drain on the near side in the drawing. The drain 408b is a drain on the far side in the drawing. The drains 404a and 404b are connected to a pump (not illustrated), and discharge the fluid material in accordance with suction force of the pump. Also in a case of such a configuration, the fluid material flowed out onto the stage 14 can be appropriately collected.

INDUSTRIAL APPLICABILITY

The present disclosure can be preferably applied to a building apparatus, for example.

What is claimed is:

1. A building apparatus for building a three-dimensional object, the building apparatus comprising:
a head for an object material, configured to eject the object material as a material constituting the object;
a head for a support material, configured to eject the support material as a material used for forming a support layer as a structure that supports at least part of the object during when the object is being built by the building apparatus, the support material configured to be cured in accordance with a predetermined condition;
a head for a fluid material, configured to eject the fluid material as a material keeping fluidity during when the object is being built; and
a controller configured to gradually change a position of the object being built so as to immerse and successively dissolve the support layer in a liquid from a lower side during when the object is being built, wherein
the building apparatus is configured such that when forming the support layer, part of the support layer is formed with the support material, and at least another part of the support layer is formed with the fluid material.

2. The building apparatus according to claim 1, wherein the building apparatus is further configured such that:
a remainder of the support layer is removed after building of the object is completed,
the support material is present in a cured state in the support layer, and
the fluid material keeps fluidity in the support layer until the support layer is removed.

3. The building apparatus according to claim 1, wherein the building apparatus is further configured such that:
the support material is a material configured to be cured by being irradiated with an ultraviolet ray.

4. The building apparatus according to claim 1, wherein the building apparatus is further configured such that:
the fluid material is water.

5. The building apparatus according to claim 1, wherein the building apparatus is further configured such that when forming the support layer, at least part of the support layer is configured to be formed by:
forming a support material region as a region having a structure defining a cavity; and
filling the fluid material in the cavity of the support material region.

6. The building apparatus according to claim 1, wherein the building apparatus is further configured such that:
when forming the support layer, the head for a support material and the head for a fluid material are caused to eject the support material and the fluid material, so that the support material and the fluid material are present in a mixed manner at a ratio in a range set in advance in at least part of the support layer.

7. The building apparatus according to claim 1, wherein the building apparatus is further configured such that:
when forming the support layer, at least part of a portion of the support layer configured to be in contact with the object is formed only with the fluid material without using the support material.

8. The building apparatus according to claim 1, wherein the building apparatus is further configured such that:
the support material in a cured state is dissolved in the liquid, and
the object is built while at least part of the support layer is immersed in the liquid in at least part of a period during which the object is being built.

9. The building apparatus according to claim 8, wherein the building apparatus is further configured such that:
when forming the support layer, part of the support layer is formed with the object material.

10. The building apparatus according to claim 1, wherein the building apparatus is further configured such that:
the support material in a cured state is dissolved in the fluid material.

11. The building apparatus according to claim 1, further comprising:
- a stage, having an upper surface on which the object being built is placed; and
- a fluid receiving part, configured to receive the fluid material flowed out onto the stage when the fluid material ejected from the head for a fluid material flows out onto the stage.

12. The building apparatus according to claim 11, wherein the building apparatus is further configured such that:
- the fluid receiving part is a recessed part formed on a surface of the stage opposed to the head for a fluid material.

13. The building apparatus according to claim 11, wherein the building apparatus is further configured such that:
- the fluid receiving part is arranged on a lower side of the stage to receive the fluid material flowed out from the stage.

* * * * *